United States Patent [19]

Saito

[11] 4,141,639
[45] Feb. 27, 1979

[54] LENS BARREL FOR CAMERA

[75] Inventor: Kiyoji Saito, Tokyo, Japan

[73] Assignee: Nippon Kogaku K.K., Tokyo, Japan

[21] Appl. No.: 849,627

[22] Filed: Nov. 8, 1977

[30] Foreign Application Priority Data

Nov. 15, 1976 [JP] Japan .......................... 51-152059[U]

[51] Int. Cl.² ............................................ G03B 17/20
[52] U.S. Cl. .................................... 354/289; 354/225; 354/273
[58] Field of Search ............... 354/202, 219, 224, 225, 354/273, 286, 289

[56] References Cited

U.S. PATENT DOCUMENTS 3,174,416  3/1965  Heerklotz ............................ 354/289
3,461,783  8/1969  Fujii ................................... 354/46 X Primary Examiner—John Gonzales
Attorney, Agent, or Firm—Fitzpatrick, Cella, Harper & Scinto

[57] ABSTRACT

A lens barrel has an aperture ring adapted to be positioned adjacent a camera when the lens barrel is mounted to the camera, and has on the aperture ring an interlocking pawl for transmitting the lens-side information to the exposure meter of the camera. An aperture scale usable for display within the camera viewfinder is formed on the aperture ring between the interlocking pawl and that end of the lens barrel which is adjacent to the camera. A light passing portion is provided in the interlocking pawl for passing therethrough light for illuminating the aperture scale for display within the viewfinder.

9 Claims, 2 Drawing Figures

LENS BARREL FOR CAMERA

BACKGROUND OF THE INVENTION

1. Field of the Invention

This invention relates to a lens barrel for a camera.

2. Description of the Prior Art

In cameras of the through-the-lens or TTL metering type, each interchangeable lens is provided with an interlocking pawl for transmitting the open F-value and/or the preset aperture value of the lens to the metering circuit in the camera. This interlocking pawl is designed to be connectible to an exposure interlocking pin provided in the viewfinder when the lens barrel has been mounted to the camera, thereby enabling interchange of the viewfinder containing the metering circuit. An aperture scale is also formed adjacent to the interlocking pawl so that it may be observed extraneously of the camera.

In new cameras permitting the use of such a lens barrel, for example, cameras of the type in which the interlocking pawl is not used to transmit the lens-side information, such as preset aperture value, to the camera side, but in which the information is transmitted to the metering circuit by a different type of interlocking mechanism or other means, the preset aperture value which is seen on the lens barrel is introduced directly into the viewfinder through the display optical system. However, where the interlocking pawl is not eliminated, by taking into account the interchangeability of the lens barrel with conventional cameras, the very presence of the interlocking pawl has made it difficult to introduce the aperture scale for extraneous observation into the viewfinder.

SUMMARY OF THE INVENTION

I have conceived and contribute by the present invention a lens barrel having an interlocking pawl and which facilitates the introduction of the aperture scale into the viewfinder.

According to the present invention, the lens barrel having an aperture ring equipped with an interlocking pawl for transmitting the lens-side information to the exposure meter of a camera, the aperture ring being adjacent to the camera when the lens barrel is mounted to the camera, comprises an aperture scale usable for display within the camera viewfinder and formed on the aperture ring between the interlocking pawl and that end of the lens barrel which is adjacent to the camera, and the interlocking pawl having light-transmitting means for passing therethrough light for illuminating the aperture scale for display within the viewfinder. The light-transmitting means may be provided in the interlocking pawl at a position opposite the aperture scale and may take the form of a slotted or cut-away portion in the pawl, or the light-transmitting means may be constituted by the light-transmitting means itself formed of a light-transmitting substance.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRITION OF THE DRAWINGS

Specific embodiments of the invention have been chosen for purposes of illustration and description, and are shown in the accompanying drawings, forming a part of the specification wherein:

FIG. 1 is a perspective view of the lens barrel according to the present invention; and FIG. 2 shows the lens barrel of the present invention as it is mounted to a camera.

DESCRIPTION OF THE PREFERRED EMBODIMENTS

Figure 1:
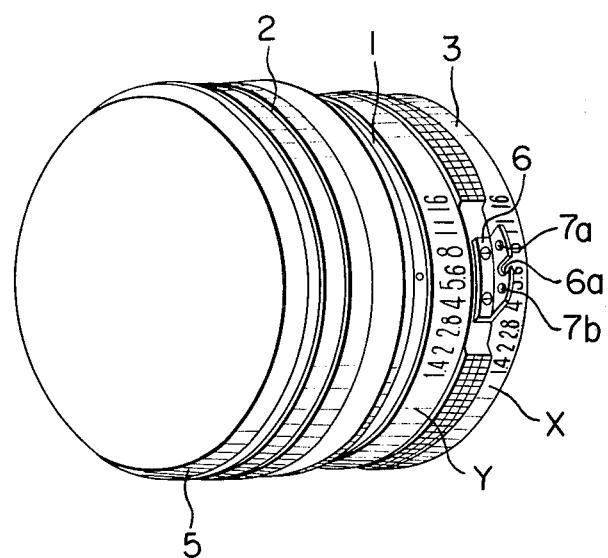
Figure 2:
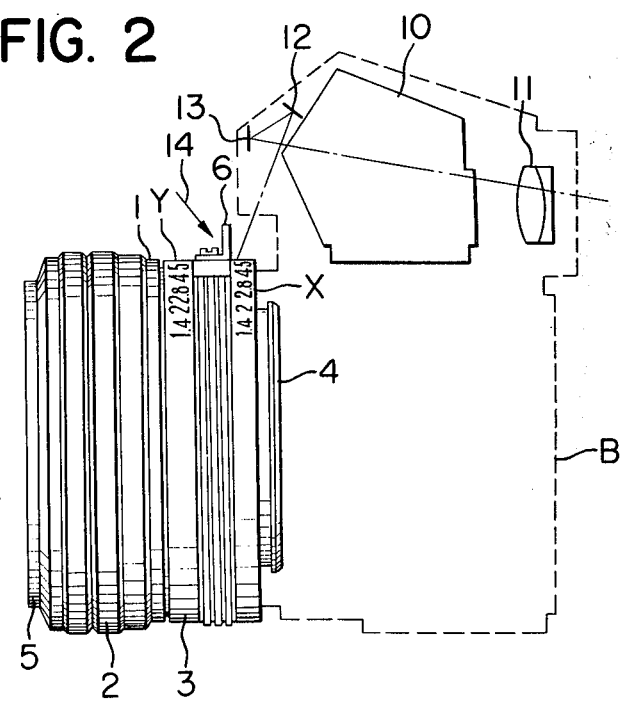

In FIGS. 1 and 2, reference character 1 designates a stationary ring, and 2 a distance ring. Aperture scale X to be displayed within the viewfinder is located on the side of a preset aperture ring 3 which is adjacent to a coupler 4 for coupling the lens barrel to the camera body, and aperture scale Y to be observed extraneously of the camera is located on the preset aperture ring 3 at the side of the front frame 5 of the lens barrel in the direction of the optic axis. An interlocking pawl 6 for transmitting the open F-value and/or the preset aperture value of the lens to the metering circuit (not shown) of the camera is fixed to the aperture ring 3 between the aperture scale X for viewfinder display and the aperture scale Y for extraneous observation, as by screws. The interlocking pawl 6 is provided with a groove 6a (FIG. 1) engageable with the exposure interlocking pin (not shown) of an interlocking mechanism provided on that side of the camera which is adjacent to the metering circuit. The interlocking pawl 6 is also provided with light-transmitting portions 7a and 7b spaced apart in accordance with the spacing between the divisions of the aperture scale X for viewfinder display, so as to prevent entry of extraneous light onto the aperture scale X from being blocked. That is, some of the divisions of the aperture scale X for viewfinder display are located so as to correspond to the locations of the light-transmitting portions 7a, 7b and slot 6a which also acts as a light-transmitting portion.

Referring to FIG. 2 illustrating the lens barrel as it is mounted on a camera, the interlocking mechanism of which is not engageable with the interlocking pawl 6, there is also shown a pentaprism 10, an eyepiece 11 and optical members 12 and 13 positioned within the camera B and disposed to introduce an image of the aperture scale X into the pentaprism for viewfinder display. Although the light-transmitting portions 7a and 7b are provided in those areas of the interlocking pawl 6 which would otherwise block the passage of extraneous light 14 onto the aperture scale X for viewfinder display, it is apparent that the interlocking pawl 6 itself may be formed of a plastic, for example, having a light-transmitting property to permit the aperture scale X to be illuminated in the same manner as described above.

With the above-described construction of the interlocking pawl 6, when the preset aperture ring 3 is rotated about the optic axis of the lens to select any desired aperture value, the viewfinder display aperture scale X is either directly illuminated by extraneous light introduced into the pentaprism 10 through the optical members 12, 13, or the aperture scale X is illuminated through the slot 6a and light-transmitting portions 7a, 7b of the interlocking pawl 6 and introduced into the pentaprism 10 through the optical members 12, 13.

According to the present invention, as has been described above, there is provided an interchangeable lens barrel usable with both cameras of the type in which the transmission of the preset aperture value from the lens barrel depends on an interlocking pawl, and cameras of the type in which the transmission of the preset aperture value from the lens barrel does not depend on the interlocking pawl but in which the aperture scale formed on the preset aperture ring is displayed directly within the viewfinder. Also, according to the preset invention, the same effect as described may be obtained not only with single lens reflex cameras, in which the transmission of the preset aperture value takes place, but also with the cameras of the interchangeable lens type in which the transmission of the aperture value takes place in a conventional manner.

I believe that the construction and operation of my novel camera lens barrel will now be understood and that the advantages thereof will be fully appreciated by those persons skilled in the art.

I claim:

1. A lens barrel having an aperture ring, an interlocking pawl on said aperture ring for transmitting the lens-side information to the exposure meter of a camera, said aperture ring being adjacent the camera body when the lens barrel is mounted to the camera, said lens barrel comprising:
    an aperture scale usable for display within the camera viewfinder and formed on said aperture ring between said interlocking pawl and that end of said lens barrel which is adjacent to the camera body; and
    said interlocking pawl having light transmitting means for passing therethrough light for illuminating said aperture scale for display within the viewfinder.

2. A lens barrel according to claim 1, wherein said light transmitting means is provided in said interlocking pawl at a position opposite said aperture scale.

3. A lens barrel according to claim 2, wherein said light transmitting means is a slotted or cut-away portion formed in said interlocking pawl.

4. A lens barrel according to claim 1, wherein said light transmitting means is the interlocking pawl itself formed of a light-transmitting substance.

5. A lens barrel according to claim 2, wherein said light transmitting means includes a cut-away portion and two cut-away portions formed in said interlocking pawl at both sides of said cut-away portion.

6. In a lens barrel comprising
    an aperture ring
    an interlocking pawl provided on said aperture ring,
    an engaging portion formed on the interlocking pawl to transmit the lens-side information to the exposure meter of a camera having an interlocking mechanism which is engageable with the engaging portion of the interlocking pawl, the improvement comprising
    a series of graduations forming an aperture scale usable for display within the view finder of a camera which has optical means for introducing the image of the graduations into the camera view finder, said aperture scale being formed on said aperture ring between said interlocking pawl and the end of the lens barrel which is adjacent the camera body,
    said engaging portion being located opposite to at least one of said graduations and being so formed that light for illuminating said at least one of said graduations may be passed through the engaging portion.

7. A lens barrel according to claim 6, wherein said engaging portion is a cut-away portion formed in said interlocking pawl.

8. A lens barrel according to claim 7, wherein said interlocking pawl is formed with an opening in the neighborhood of each side of the cut-away portion to allow light for illuminating different graduations to pass through the openings.

9. A lens barrel according to claim 6, comprising a further aperture scale formed on the aperture ring for extraneous observation.

* * * * *